F. O. RAY.
TRAP.
APPLICATION FILED APR. 28, 1915.
1,215,854.
Patented Feb. 13, 1917.
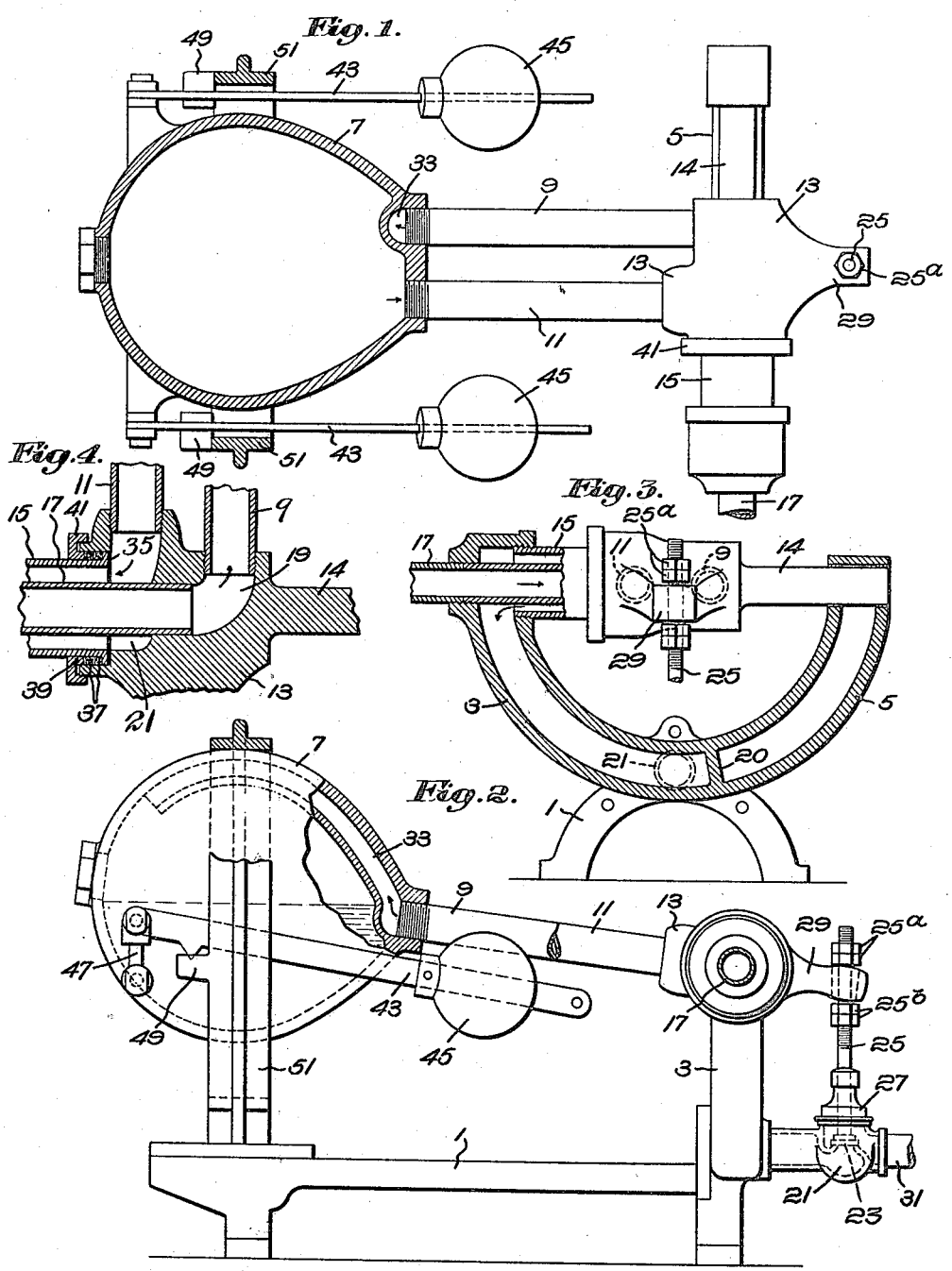
Inventor:
Frank O. Ray,
by Munn, Booth, Janney & Varney
Attys.

UNITED STATES PATENT OFFICE.

FRANK O. RAY, OF NASHUA, NEW HAMPSHIRE.

TRAP.

1,215,854.　　　　Specification of Letters Patent.　　Patented Feb. 13, 1917.

Application filed April 28, 1915. Serial No. 24,565.

*To all whom it may concern:*

Be it known that I, FRANK O. RAY, a citizen of the United States, residing at Nashua, county of Hillsboro, State of New Hampshire, have invented an Improvement in Traps, of which the following description, in connection with the accompanying drawings, is a specification, like characters on the drawings representing like parts.

This invention relates to steam traps and among other objects aims to provide a simple and effective construction for automatically discharging the water accumulated in the bowl of the trap without pocketing any air therein such as would prevent the proper operation thereof.

The character of the invention may be best understood by reference to the following description of the illustrative embodiment thereof shown in the accompanying drawing, wherein:

Figure 1 is a plan view, partly in section, of the illustrative trap shown herein as embodying the invention;

Fig. 2 is a side elevation, partly in section, of the trap;

Fig. 3 is an end elevation, partly in section, of the trap, and

Fig. 4, on an enlarged scale, is a sectional detail to be referred to.

Referring to the drawing, the illustrative steam trap shown herein as embodying the invention comprises a standard in the form of a tripod 1 provided at one end thereof with a yoke having upwardly curved arms 3 and 5. These arms serve to support a bowl 7 preferably of pear-shaped form. This bowl is provided with a tube 9 for conducting water of condensation of steam thereto and with a tube 11 for conducting accumulated water of condensation therefrom. The tubes have ends tapped into a boss projecting from the bowl and ends tapped into a coupling member 13. This coupling member has a stud shaft 14 projecting from one end thereof journaled in a bearing in the arm 5. The other end of said coupling member is adapted to rock on outer and inner pipes 15 and 17 tapped into the upper end of the arm 3. The inner pipe 17 may be connected directly to a pipe (not shown) for conducting the water of condensation from any suitable source to the trap. The coupling member is formed to present chambers 19 and 21, the former communicating both with the bowl tube 9 and with the inner pipe 17 and the latter communicating with the bowl tube 11 and the annular space formed between the outer and inner pipes. This annular space also communicates with the hollow arm 3 of the tripod. Communication between the arms 3 and 5 is prevented by a partition 20 at the base of the yoke.

To control the discharge of the water, a fitting 21 is tapped into the base of the yoke and contains a valve 23 connected to the lower end of a stem 25 which extends up through a stuffing-box 27 on the fitting and its upper end projects through an eye in an arm 29 on the coupling member referred to. Nuts 25ª and 25ᵇ on the stem above and beneath said arm are adapted to be engaged by the arm for automatically opening and closing said valve on the tilting of the bowl.

The valve fitting may be connected by a pipe 31 with a tank or other means for receiving the water of condensation discharged.

In traps employed to discharge into a tank or into atmospheric pressure, the water accumulated in the bowl flows out by gravity or by the pressure back of the water coming into the bowl. The effectiveness of this pressure has heretofore been greatly reduced owing to the introduction of the water into the bowl beneath the level of the water therein. Thus the entrained air or steam in the water had to work up through the water before becoming effective to drive the water from the bowl. Some of this air would follow out with the discharging water but some would remain pocketed in the bowl. The volume of air remaining would be added to in succeeding discharging operations until eventually there would be built up in the bowl a pressure sufficient to prevent the entrance therein of a sufficient volume of water to overcome the counterbalance weight and cause the tilting and discharging of the bowl. As a result the trap would fail to discharge. To relieve this pressure from the bowl, a vent cock has been introduced in the wall thereof, but this had to be operated manually and was found ineffective and objectionable.

One of the objects of the present invention is to provide a simple and effective construction whereby the air in the bowl may be automatically removed therefrom, thereby insuring permanent and effective operation. To accomplish this a duct 33 is provided, conveniently formed integral with the wall of the bowl, and forming a continuation of the bowl inlet tube 9 referred to. This duct extends from said tube up along the upper wall of the bowl 8 to a point adjacent the top thereof.

By this construction the water and entrained air are introduced into the bowl above the level of the water therein and the latter can rise and substantially fill the bowl while the outlet end of the duct 33 is above said level. Therefore when the discharge valve is opened the pressure back of the incoming water will act on the surface of the water and force the latter out through the outlet tube 11. The force of the discharge will be sufficient to cause air in the bowl back of the water to follow on out through said tubes. As a result, on each discharge the bowl is freed from air in such a way as to prevent the building up of pressure therein to check or arrest the proper inflow of water. On the contrary, the bowl always operates promptly, positively and automatically.

The location of the inlet duct 33 along the wall directs the inflow advantageously along the wall thereof, thereby causing the same to sweep down around the inner surface of the bowl toward the entrance of the outlet tube 11.

Another feature of the invention relates to means for preventing leakage between coupling member 13 and the outer pipe 15. To accomplish this a stuffing-box is provided comprising a flange 35 projecting outward from said pipe and serving as a bearing on which the coupling member is journaled. One or more packing rings 37 of asbestos or other appropriate material are placed over the pipe and are urged against said flange by a gland 39 and a cap 41 threaded on said coupling member. When this cap is tightened in place, it will press the packing rings toward said flange and cause them to come into water-tight engagement with said pipe and the inner wall of said member encircling said pipe. However, they will not engage said parts with sufficient pressure to prevent a free and proper rocking of the bowl about said pipe. This constitutes a simple and effective construction for preventing any possibility of leakage from the coupling member past the pipe. For any water to escape it would have to work past the pipe flange in between said flange and the packing ring against the same and thence along past the packing rings out between the cap and the pipe. It would be impossible for the water to escape along this circuitous path so long as the packing rings are in good condition.

Another feature of the invention relates to means for counter-balancing the bowl so that it will not tilt down to open the discharge valve until after a predetermined amount of water has accumulated therein.

Heretofore to accomplish this, there has been provided a large weight on a long arm so constructed and fulcrumed that the weight would rock a considerable distance in the course of the tilting movement of the bowl thereby producing an objectionable pounding of the bowl against the stop for limiting its upward movement. To prevent this objectionable pounding, the bowl shown herein is equipped at the opposite sides thereof with short levers 43 having small weights 45 adjustably mounted thereon, said levers being connected by links 47 to ears on the bowl. The levers are provided with wedge-shaped projections which rest in indentations on lugs 49 projecting inward from a ring 51 rising from the tripod referred to and serving to limit the up-and-down tilting movements of the bowl.

The combined effect of the short arms and small weights described will be sufficient to counterbalance the bowl, but without permitting the weights to rock through a long arc of movement and acquire sufficient momentum to obtain the objectionable pounding effect referred to.

From the above description it is believed the operation of the trap may be readily understood. Assuming the bowl to be in its uptilted position, the discharge valve will then be closed and the bowl will be in readiness to be filled. Water of condensation will flow from the source of supply into the inlet pipe 17 through the coupling member, thence into the bowl tube 9 and up through the duct 33 and be delivered from the latter into the bowl adjacent the top thereof. When sufficient water has accumulated to overcome the counter-balance weights, the bowl will tilt downward about the axis of the pipe 15 and the stud shaft 14. This will automatically open the discharge valve and permit the water in the bowl to flow out through the tube 11, the coupling member 13, between the outer and inner pipes 15 and 17, thence down through the hollow arm 3 of the yoke into the valve fitting 21 past the valve therein, and out through the discharge pipe. Since the trap is continuously open to the incoming water of condensation, it is subject to the pressure back of the water of condensation. This pressure will be directed down onto the surface of the water in the bowl, and being greater than the atmospheric pressure at the outlet, will drive the water from the bowl, together with any air or steam entrained with the incoming water of condensation. Thus in each discharging operation, air or steam pocketed above the level of the water in the bowl is forced therefrom and cannot accumulate and produce a built-up pressure to prevent the proper filling and automatic discharging of the bowl.

Having described one illustrative embodiment of the invention without limiting the same thereto, what I claim as new and desire to secure by Letters Patent, is:

A steam trap comprising a standard 1 having a yoke 3, 5 and an upright 51 provided with a stop, a tilting receiver 7 fulcrumed on said yoke, a pair of short levers connected to opposite sides of said receiver and fulcrumed on said upright at opposite sides of said receiver, said levers having ends projecting toward said yoke, and counter-balance weights mounted on said levers, said weights and levers having provision for preventing undue pounding of said receiver against said stop.

In testimony whereof, I have signed my name to this specification, in the presence of two subscribing witnesses.

FRANK O. RAY.

Witnesses:
HENRY T. WILLIAMS,
ROBERT H. KAMMLER.

Copies of this patent may be obtained for five cents each, by addressing the "Commissioner of Patents, Washington, D. C."